US009065529B2

(12) United States Patent
Tessandori

(10) Patent No.: US 9,065,529 B2
(45) Date of Patent: Jun. 23, 2015

(54) METHOD FOR CHARACTERIZING A TRANSMITTING ANTENNA OF A SATELLITE IN ORBIT AND ASSOCIATED SYSTEM

(71) Applicant: THALES, Neuilly-sur-Seine (FR)

(72) Inventor: Stephane Tessandori, Cannes la Bocca (FR)

(73) Assignee: THALES, Courbevoie (FR)

( * ) Notice: Subject to any disclaimer, the term of this patent is extended or adjusted under 35 U.S.C. 154(b) by 116 days.

(21) Appl. No.: 14/020,514

(22) Filed: Sep. 6, 2013

(65) Prior Publication Data
US 2014/0073239 A1    Mar. 13, 2014

(30) Foreign Application Priority Data

Sep. 7, 2012   (FR) ...................................... 12 02393

(51) Int. Cl.
*H04B 7/185*   (2006.01)

(52) U.S. Cl.
CPC .......... *H04B 7/18519* (2013.01); *H04B 7/1851* (2013.01); *H04B 7/185* (2013.01); *H04B 7/18513* (2013.01)

(58) Field of Classification Search
USPC ............. 455/3.03, 12.1, 13.2, 98, 427, 404.1, 455/404.2, 456.1, 9; 701/213; 244/158.1, 244/158.4, 158.6
See application file for complete search history.

(56) References Cited

U.S. PATENT DOCUMENTS

| | | | | |
|---|---|---|---|---|
| 4,071,211 | A * | 1/1978 | Muhlfelder et al. | 244/165 |
| 5,042,752 | A * | 8/1991 | Surauer et al. | 244/164 |
| 5,540,405 | A * | 7/1996 | Bender et al. | 244/166 |
| 5,697,050 | A | 12/1997 | Wiedeman | |
| 6,231,011 | B1 * | 5/2001 | Chu et al. | 244/165 |
| 6,628,921 | B1 * | 9/2003 | Vaddiparty et al. | 455/12.1 |
| 6,989,786 | B1 | 1/2006 | Dong | |
| 2002/0116993 | A1 * | 8/2002 | Patouraux | 73/178 R |
| 2002/0168991 | A1 * | 11/2002 | Kochanski et al. | 455/505 |
| 2004/0242151 | A1 * | 12/2004 | Park | 455/3.02 |
| 2005/0282542 | A1 * | 12/2005 | Karabinis | 455/429 |
| 2009/0195444 | A1 * | 8/2009 | Miller | 342/352 |
| 2009/0257471 | A1 * | 10/2009 | Tanaka et al. | 375/130 |
| 2009/0298422 | A1 | 12/2009 | Conroy et al. | |
| 2010/0292579 | A1 * | 11/2010 | Sato | 600/474 |

FOREIGN PATENT DOCUMENTS

WO   2010/092421  A1   8/2010

* cited by examiner

*Primary Examiner* — Dominic E Rego
(74) *Attorney, Agent, or Firm* — Baker & Hostetler LLP

(57) ABSTRACT

A method for characterizing a transmitting antenna of a satellite in orbit comprising a payload comprising signal amplification means, includes: configuring the said amplification means to generate thermal noise at the input of the transmitting antenna; acquiring, by means of a ground station, the signal transmitted by the transmitting antenna on the downlink of the satellite over a predetermined time period; during the said predetermined time period, controlling the said satellite in orbit in order to impart on it an angular bias of predetermined variation and recording this variation; correlating the measurement of the signal transmitted on the downlink and the variation of angular bias of the satellite in order to derive therefrom the gain variations of the transmitting antenna as a function of the angular bias of the satellite.

5 Claims, 5 Drawing Sheets

METHOD FOR CHARACTERIZING A TRANSMITTING ANTENNA OF A SATELLITE IN ORBIT AND ASSOCIATED SYSTEM

CROSS-REFERENCE TO RELATED APPLICATION

This application claims priority to foreign French patent application No. FR 1202393, filed on Sep. 7, 2012, the disclosure of which is incorporated by reference in its entirety.

FIELD OF THE INVENTION

The invention relates to a method and a system for testing the payload of a satellite in orbit. More precisely, the invention relates to the characterizing of the transmitting antenna of a satellite in orbit.

The field of the invention is that of methods and systems making it possible to test the nominal operation of a transmitting antenna of a satellite in orbit, that is to say to characterize the radiation pattern of the antenna and to compare it with expected operational specifications.

The invention is notably applied for testing a telecommunications satellite in orbit but also any satellite whose payload is composed by at least one repeater and an antenna for transmitting in the direction of a downlink.

BACKGROUND

The known methods of testing the payload of a satellite in orbit are most often based on the use of a test signal on an unmodulated carrier which is generated and transmitted on the uplink of the satellite in orbit by a ground station coupled to the test device. The satellite receives this test signal via a receiving antenna; the signal is propagated through a repeater and retransmitted to the ground station via a transmitting antenna. It is possible to characterize the response of the transmitting antenna of the satellite from measurements carried out on the signal transmitted on the downlink of the satellite.

There are many disadvantages of test methods based on the use of specific test signals.

The transmitting antenna test is limited to a part of the cover area of the receiving antenna. In fact, in order that the test method may be used, the ground station, which operates both the transmission of the test signal on the uplink and the acquisition of the signal retransmitted by the satellite on the downlink, must be positioned within the area of intersection of the cover areas of the receiving antenna and of the transmitting antenna of the satellite. Thus, it is not possible to test the transmitting antenna over the whole of its angular cover.

Moreover, the extraction of the contribution of the transmitting antenna alone necessitates the use of an automatic gain loop in order to compensate for the gain variations of the receiving antenna. This loop provides a constant level at the input interface of the transmitting antenna, which makes it possible to measure, on the ground, solely the variations of the transmitting antenna. However, as the radiation pattern of the receiving antenna is generally more directive than that of the transmitting antenna, the result of this is that the dynamic measuring range of the transmitting antenna under test is limited to the dynamic range available in the automatic gain control loop.

Moreover, the isolation measurements, that is to say characterizing of the transmitting antenna for cover areas in which the gain of the antenna is very low, are also limited by the weak reception level on the receiving antenna.

Another problem associated with the use of test signals is that when it is desired to test the operation of a multi-beam transmitting antenna or of an antenna transmitting at several frequencies, this necessitates the generation of multi-carrier test signals and therefore a device for generating such signals, which increases the complexity of the test system.

Finally, the generation of a test carrier can interfere with other adjacent satellites and this necessitates overall frequency coordination.

SUMMARY OF THE INVENTION

The present invention proposes a method and a system which make it possible to characterize the transmitting antenna of a satellite in orbit over the whole of its dynamic range and over the whole of its cover area, independently with respect to the characteristics of the receiving antenna.

The invention does not necessitate the use of test signals on an unmodulated carrier and therefore makes it possible to eliminate the disadvantages associated with their use.

Moreover, the invention makes it possible to test the transmitting antenna of a satellite having several beams and/or several separate frequencies without necessitating the modification of test equipment and thereby increasing its complexity.

The invention thus relates to a method for characterizing a transmitting antenna of a satellite in orbit comprising a payload comprising signal amplification means, the said method consisting in:

Configuring the said amplification means to generate thermal noise at the input of the transmitting antenna, Acquiring, by means of a ground station, the signal transmitted by the transmitting antenna on the downlink of the satellite over a predetermined time period, During the said predetermined time period, controlling the said satellite in orbit in order to impart on it an angular bias of predetermined variation and recording this variation, Correlating the measurement of the signal transmitted on the downlink and the variation of angular bias of the satellite in order to derive therefrom the gain variations of the transmitting antenna as a function of the angular bias of the satellite.

Advantageously, the amplification means are configured to operate at saturation.

The amplification means can also comprise a first intermediate amplification means and a second high power amplification means, the said intermediate amplification means being configured to amplify the signal to a predetermined level at the input of the second high power amplification means, the said level being determined so that the level of the output signal of the second high power amplification means is higher than the noise level generated by the antenna of the ground station.

According to a particular embodiment of the invention, the payload comprises at least one receiving antenna and a reception channel and wherein the reception channel is disconnected from the receiving antenna in order to limit the influence of the noise coming from the uplink of the satellite.

The invention also relates to a system for characterizing a transmitting antenna of a satellite in orbit comprising a payload comprising signal amplification means, the said system comprising:

Means of configuring the said amplification means in order to generate thermal noise at the input of the transmitting antenna, Means of acquiring the signal transmitted by the transmitting antenna on the downlink of the satellite over a predetermined time period, Means for controlling the satellite in orbit, during the said predetermined time period, in order to impart on it an angular bias of predetermined variation and means of recording this variation, Means for correlating the measurement of the signal transmitted on the downlink and the variation of angular bias of the satellite in order to derive therefrom the gain variations of the transmitting antenna as a function of the angular bias of the satellite

BRIEF DESCRIPTION OF THE DRAWINGS

Other features and advantages of the present invention will become more apparent on reading the following description with reference to the appended drawings in which.

DETAILED DESCRIPTION

Figure 1:
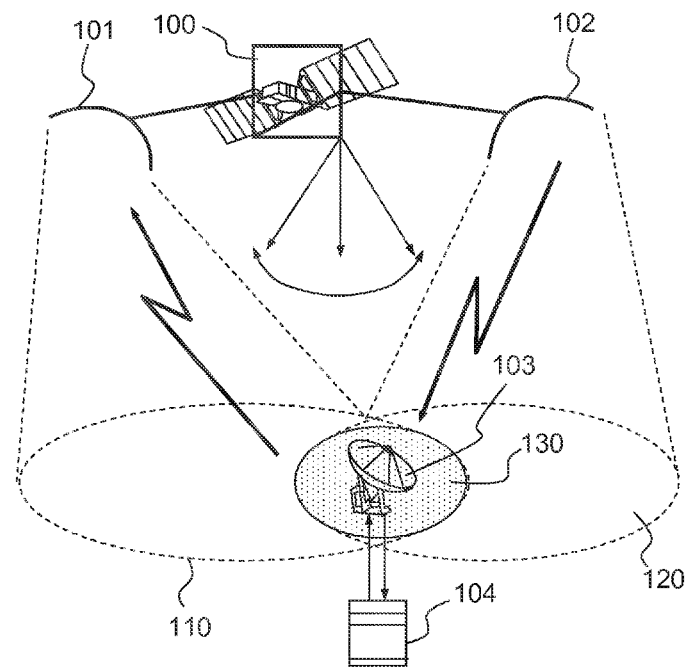
FIG. 1 is a synoptic diagram showing a method of testing the transmitting antenna of a satellite in orbit according to the prior art.
Figure 2:
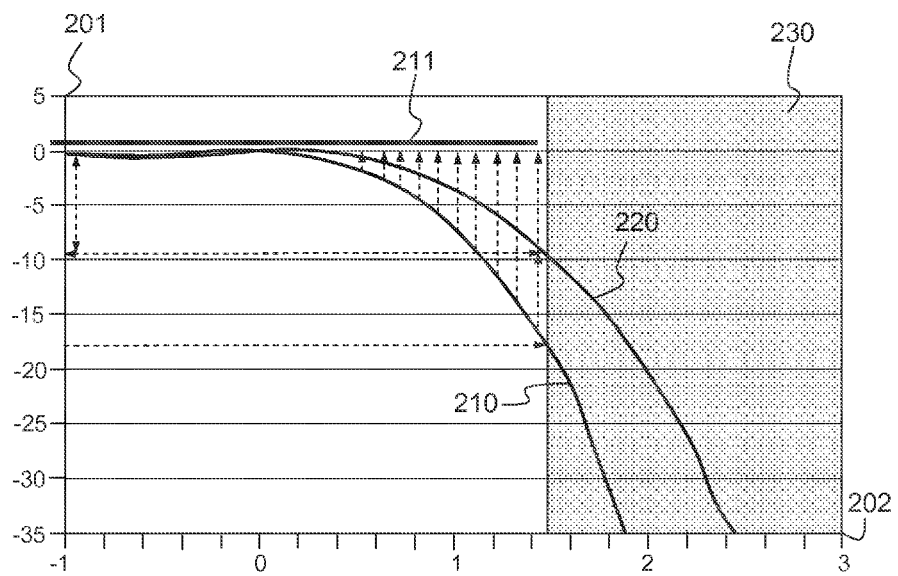
FIG. 2 is a graph showing the limitation, induced by the test method shown in FIG. 1, on the dynamic angular range of mispointing of the transmitting antenna which can be tested.
Figure 3:
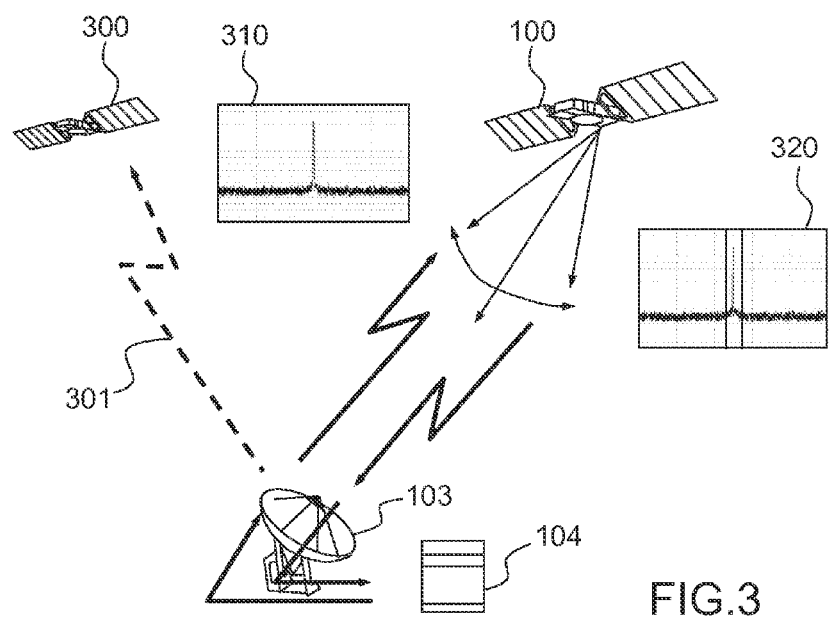
FIG. 3 is a synoptic diagram showing certain disadvantages of the test method shown in FIG. 1.

FIGS. 1, 2 and 3 show, in several diagrams and graphs, the principle of a known method of testing the transmitting antenna of a satellite in orbit and its disadvantages as already mentioned in the introduction section of the present application.

FIG. 1 shows, in a diagram, the principle of a known method of testing the transmitting antenna 102 of a satellite 100 in orbit.

A test station 104, coupled to an antenna 103, is used for generating a test signal on an unmodulated carrier and for transmitting it on the uplink of the satellite 100. The test signal is received by the receiving antenna 101 of the satellite 100 and then retransmitted by the transmitting antenna 102 of the satellite 100 via the downlink. The signal is received by the antenna 103 of the test station 104 which carries out measurements on it making it possible to characterize the antenna pattern of the transmitting antenna 102.

As explained above, a disadvantage of this method is that the testable cover area is limited to the area of intersection 130 between the cover area 110 of the receiving antenna 101 and the cover area 120 of the transmitting antenna 102.

FIG. 2 shows, in a graph, the relative antenna gain 201, expressed in decibels, as a function of the angular bias 202 imparted by the satellite with respect to a reference pointing direction. The respective gain curves of the receiving antenna 210 and of the transmitting antenna 220 of the satellite are shown in the graph of FIG. 2. The receiving antenna is generally more directive than the transmitting antenna and this generates a faster attenuation of the antenna gain as the angular bias increases.

In order to compensate for the variations of the gain of the receiving antenna, an automatic gain control loop is actuated in the payload of the satellite in order to bring the signal at the input of the transmitting antenna back to a constant level 211. In this way, the ground station can measure, on the signal received via the downlink, only the variations of the gain of the transmitting antenna.

The automatic gain control loop has a limited dynamic input operating range. In the example shown in FIG. 2, it operates only up to an input level of the order of −20 dB. Thus, for angular biases greater than a given value, of the order of 1.5° in the example shown in FIG. 2, the variations of the gain of the receiving antenna are no longer compensated for and this means that the angular excursions 230 beyond a certain threshold cannot be tested.

FIG. 3 illustrates the necessity of a frequency coordination plan for the uplink of the satellite under test 100. A test signal on an unmodulated carrier 310 is transmitted by the antenna 103 of the test station 104 on the uplink of the satellite 100. On reception, the test station 104 retrieves, by filtering, the unmodulated carrier retransmitted on the downlink of the satellite 100.

The transmission of an unmodulated carrier 310 on the uplink can generate interference 301 on one or more adjacent satellites 300. Thus, a frequency coordination plan is necessary in order to avoid disturbing the frequencies elsewhere used by other satellites.

Figure 4:
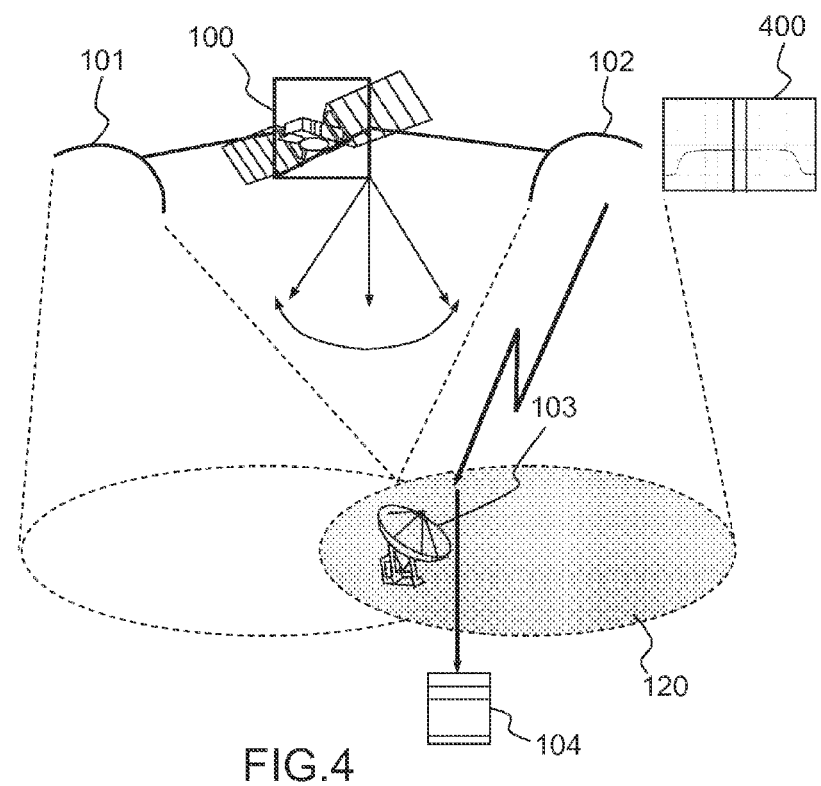
FIG. 4 is a synoptic diagram showing the test method according to the invention.

FIG. 4 shows the use of the method according to the invention making it possible to characterize the transmitting antenna 102 of a satellite in orbit 100 without generating or transmitting a test signal on the uplink of the satellite.

The method according to the invention consists in generating, on board the payload of the satellite, thermal noise of sufficient power to ensure, at the input interface of the transmitting antenna 102, the presence of wide band noise of level that is substantially constant and independent with respect to the angular excursions of the satellite. In this way, the signal transmitted by the transmitting antenna 102 on the downlink is acquired by the antenna 103 of the test station 104 and then analyzed in order to characterize the antenna gain over the whole of the cover area 120 which is no longer limited to the intersection with the cover area of the receiving antenna 101.

The noise 400 generated at the input interface of the antenna 102 is filtered by the test station 104 within a predetermined frequency analysis band.

Figure 5:
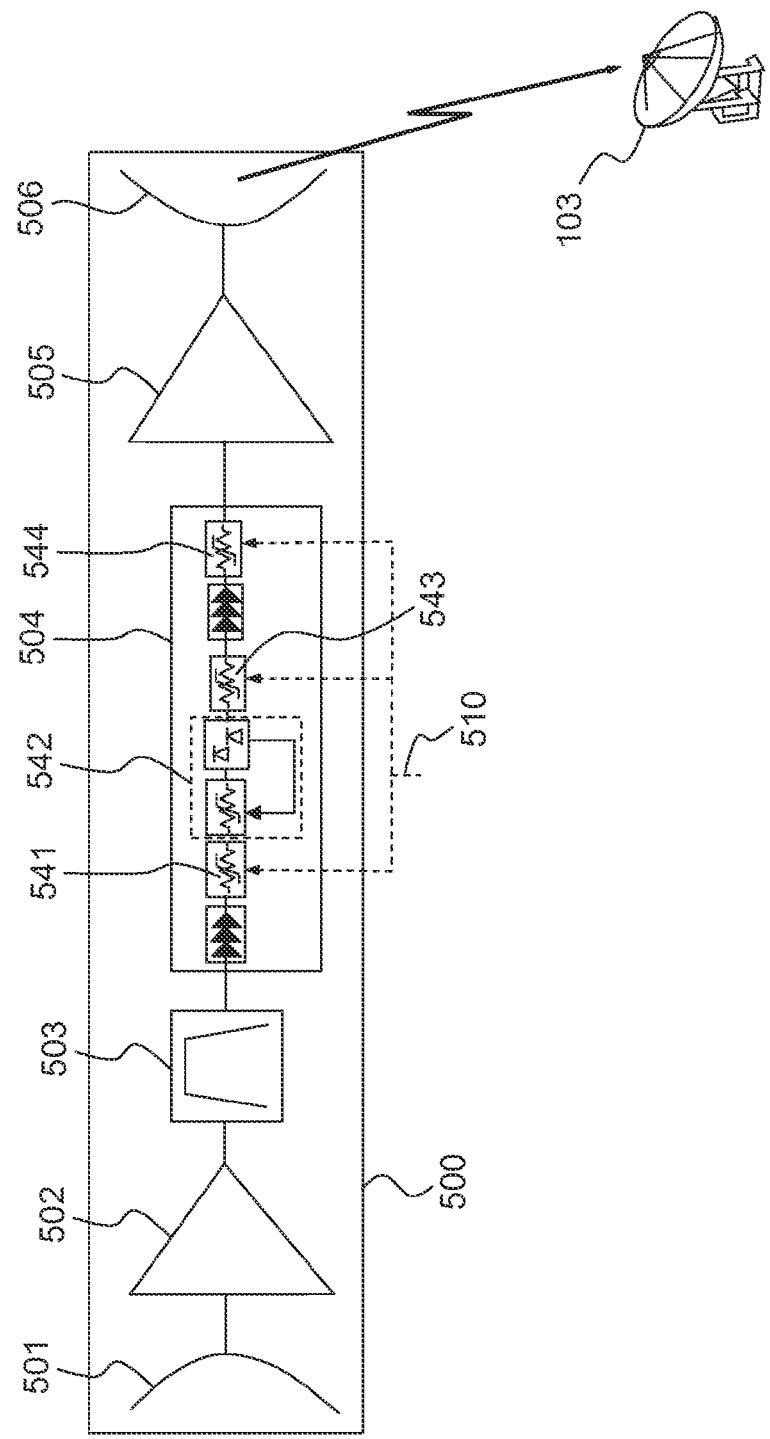
FIG. 5 is a diagram of the payload of a satellite to be tested and in particular of the on-board amplification system.

FIG. 5 shows, in a simplified block diagram, an example of a payload 500 of a satellite which comprises a receiving antenna 501, a reception channel 502, a channel filter 503, an intermediate amplification system 504, a high power amplifier 505 and a transmitting antenna 506. The payload 500 thus constituted carries out the function of a repeater, that is to say that the signal received on the reception channel 502 is retransmitted on the downlink of the satellite via the transmitting antenna 506. In the example shown in FIG. 5, a single repeater is shown, but a payload can contain several repeaters associated with several different receiving and/or transmitting frequencies.

When no signal is received by the receiving antenna 501, the payload 500 however generates noise which has two main components: a first noise component resulting from the Earth's radiation transmitted to the payload by the receiving antenna 501 and potentially containing interference coming from adjacent satellite systems, and a second thermal noise component generated by the repeater itself, in particular by the receiving system 502.

By configuring 510 the intermediate amplification system 504 in order to make it operate at saturation and thus to cause the saturation of the high power amplifier 505, it is possible to obtain a sufficient noise level at the input interface of the transmitting antenna 506 to be able to characterize its antenna pattern. The noise level generated at the output of the high power amplifier 505 must be higher than the noise level generated by the antenna 103 of the test station on the ground.

An example embodiment of the intermediate amplification system 504 and the associated configuration for obtaining the desired effect to allow the characterization of the transmitting antenna 506 will now be described in greater detail.

The amplification system 504 comprises at least a first amplifier 541 which makes it possible to adjust the signal level at the output of the channel filter 503 so that it is compatible with the dynamic range of the automatic gain control loop 542 placed at the output of the first amplifier 541. The automatic gain control loop 542 makes it possible to obtain a signal of constant level at the input of a second amplifier 543 which is capable of amplifying the signal in order to reach the desired operating point at the input of the high power amplifier 505. A third amplifier 544 is present at the output of the second amplifier 543 in order to compensate for the non-linearities of the high power amplifier 505.

The amplification system 504 example shown in FIG. 5 is given by way of illustration and is non-limiting. In particular, other amplifiers arranged in cascade can be included. For example, the automatic gain control loop 542 can be optional.

In order to obtain a sufficient noise level at the input of the transmitting antenna 506, the first and second amplifiers 541, 543 are configured to amplify the input signal with a maximum gain for the purpose of achieving operation at saturation. The third amplifier 544 is configured in order to obtain the saturation of the high power amplifier or in order to obtain a sufficient operational level which depends on the link budget of the transmitting antenna and on the link budget of the antenna of the ground station 103. The noise level thus generated also has high temporal stability which makes it possible to acquire the signal on the downlink over a time period that is sufficient for carrying out the measurements necessary for the characterization of the transmitting antenna 506.

In a variant embodiment of the invention, the reception channel 502 of the payload can be disconnected from the receiving antenna 501 of the satellite, for example by connecting its input to the input of another reception channel (not shown). In this way, the noise received by the receiving antenna 501 is eliminated and only the thermal noise generated by the repeater itself is used.

The use of the amplification system of the payload whilst operating at saturation makes it possible to replace the test signal usually generated on the uplink of the satellite. In this way, the test method does not necessitate any specific signal and does not depend on the characteristics and operation of the receiving antenna 501 of the satellite.

The test method according to the invention consists in the execution of the following steps.

The test station 104, which comprises means of acquisition of the signal transmitted on the downlink of the satellite and means of measuring and of spectral analysis of that signal, is connected to the downlink of the satellite.

The intermediate amplification system 504 on board the payload of the satellite is configured to amplify the noise of the repeater in order to reach saturation of the high power amplifier 505 or a sufficient operational noise level at the input interface of the transmitting antenna 506. The configuration of the payload of the satellite is carried out by a control centre of the satellite remote from the test station.

The spectral analysis of the signal is for example carried out by a spectrum analyzer configured to carry out a low-pass filtering of the received signal in order to smooth the level of the signal by eliminating the high frequency components. Several successive spot measurements are carried out during a time sweep.

Moreover, an angular bias is imparted on the satellite with respect to its reference pointing direction in order to allow the characterization of the antenna over the whole of its cover area and to observe the variations of the gain of the antenna as a function of time. The control of the pointing of the satellite is also carried out from a remote control centre via a remote control and telemetry link.

Means of processing the signal acquired by the test station 104, which can be included in the test station or which can be remote, are then executed in order to produce a measurement of the pattern of the transmitting antenna of the satellite. FIGS. 6a, 6b, 6c, 6d illustrate the processings carried out on the acquired signal.

Figure 6A:
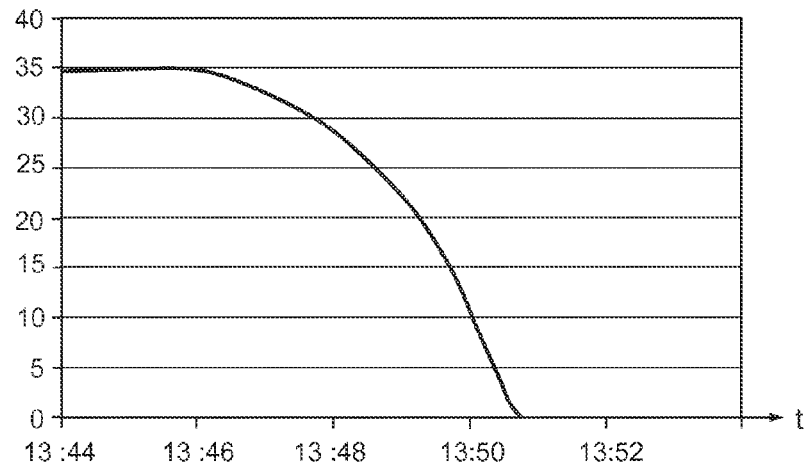
FIG. 6a is a graph of the gain of the signal measured on the downlink of the satellite as a function of time.

FIG. 6a shows, in a graph, the measurement of the level of the signal acquired by the test station, in decibels of milliwatt (dBm), as a function of time t.

Figure 6B:
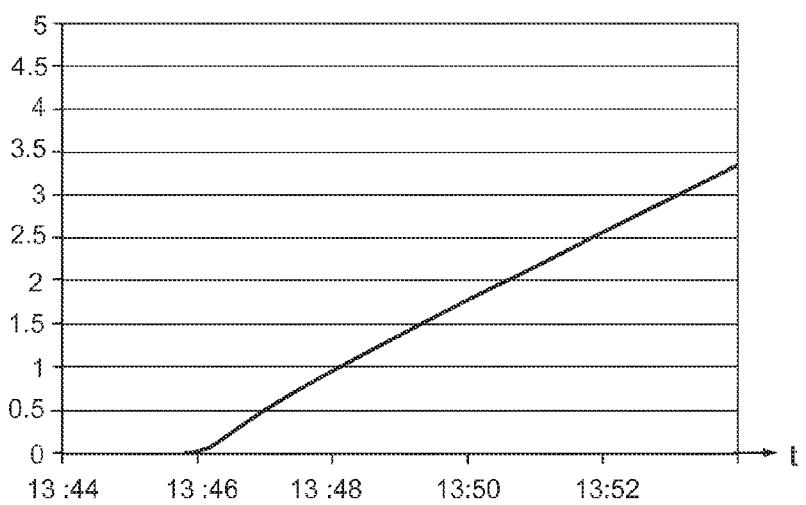
FIG. 6b is a graph of the angular bias imparted by the satellite during the acquisition of the signal on the downlink as a function of the same interval of time as in FIG. 6a, FIG. 6c shows an example of the antenna pattern obtained by combining the measurements shown in FIGS. 6a and 6b.

FIG. 6b shows, over the same time scale as FIG. 6a, the variation of the angular bias, expressed in degrees, of the pointing direction of the satellite.

Figure 6C:
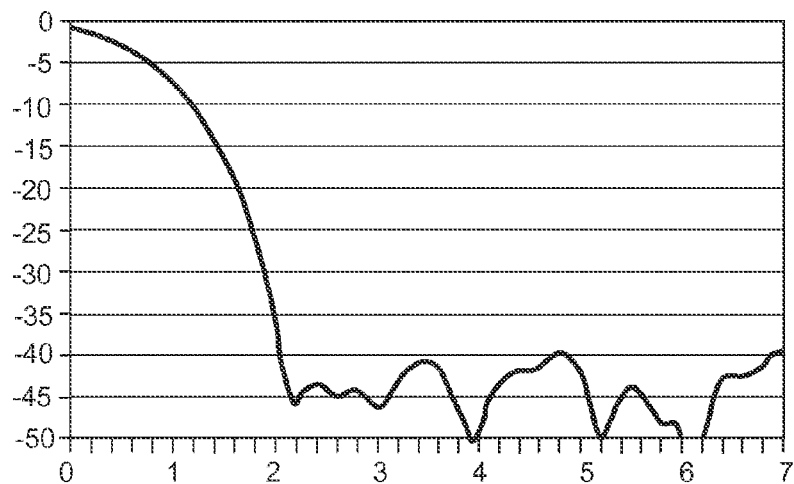
FIG. 6d shows the comparison of the antenna pattern obtained with the specifications of the transmitting antenna of the satellite.

By correlating the graphs of FIGS. 6a and 6b, the graph of FIG. 6c is obtained which gives the level of the acquired signal as a function of the angular bias imparted on the satellite.

Figure 6D:
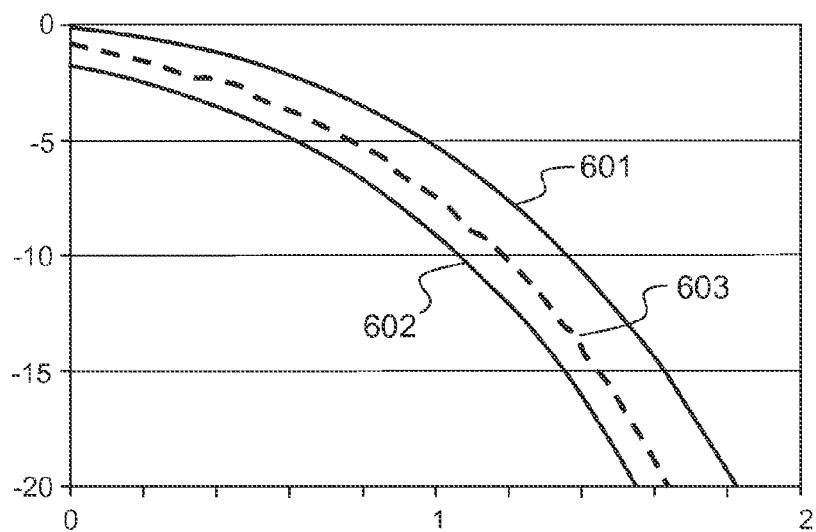

FIG. 6d shows the last step of the method according to the invention consisting in comparing the variations of the antenna gain 603, reconstituted over a given range of angular variation, with a specified envelope of the pattern of the transmitting antenna of the satellite. Such an envelope consists, for example, of a maximum gain curve 601 and a minimum gain curve 602 between which the measured gain must vary.

The invention claimed is:

1. A method for characterizing a transmitting antenna of a satellite in orbit comprising a payload comprising signal amplification means, the method comprising:
    configuring the said amplification means to generate thermal noise at the input of the transmitting antenna,
    acquiring, by means of a ground station, the signal transmitted by the transmitting antenna on the downlink of the satellite over a predetermined time period,
    during the said predetermined time period, controlling the said satellite in orbit in order to impart on it an angular bias of predetermined variation and recording this variation, and
    correlating the measurement of the signal transmitted on the downlink and the variation of angular bias of the satellite in order to derive therefrom the gain variations of the transmitting antenna as a function of the angular bias of the satellite.

2. The characterizing method according to claim 1, wherein the said amplification means are configured to operate at saturation.

3. The characterizing method according to claim 1, wherein the said amplification means comprise a first intermediate amplification means and a second high power amplification means, the said intermediate amplification means being configured to amplify the signal to a predetermined level at the input of the second high power amplification means, the said level being determined so that the level of the output signal of the second high power amplification means is higher than the noise level generated by the antenna of the ground station.

4. The characterizing method according to claim 1, wherein the payload comprises at least one receiving antenna and a reception channel and wherein the reception channel is disconnected from the receiving antenna in order to limit the influence of the noise coming from the uplink of the satellite.

5. A system for characterizing a transmitting antenna of a satellite in orbit comprising a payload comprising signal amplification means, the system comprising:

means for configuring the said amplification means in order to generate thermal noise at the input of the transmitting antenna, means for acquiring the signal transmitted by the transmitting antenna on the downlink of the satellite over a predetermined time period, means for controlling the satellite in orbit, during the said predetermined time period, in order to impart on it an angular bias of predetermined variation and means of recording this variation, and means for correlating the measurement of the signal transmitted on the downlink and the variation of angular bias of the satellite in order to derive therefrom the gain variations of the transmitting antenna as a function of the angular bias of the satellite.

* * * * *